United States Patent
Redfern et al.

(10) Patent No.: US 10,657,571 B2
(45) Date of Patent: May 19, 2020

(54) METHOD AND APPARATUS FOR FACILITATING COMPREHENSION OF USER QUERIES DURING INTERACTIONS

(71) Applicant: IntelliResponse Systems Inc., Campbell, CA (US)

(72) Inventors: Darren Redfern, Stratford (CA); Chad Thomas Ternent, Kitchener (CA)

(73) Assignee: IntelliResponse Systems Inc., Campbell, CA (US)

( * ) Notice: Subject to any disclaimer, the term of this patent is extended or adjusted under 35 U.S.C. 154(b) by 758 days.

(21) Appl. No.: 15/176,111

(22) Filed: Jun. 7, 2016

(65) Prior Publication Data

US 2016/0358240 A1 Dec. 8, 2016

Related U.S. Application Data

(60) Provisional application No. 62/172,741, filed on Jun. 8, 2015.

(51) Int. Cl.
| | |
|---|---|
| G06Q 30/06 | (2012.01) |
| G06F 16/248 | (2019.01) |
| G06F 16/2457 | (2019.01) |
| H04M 3/493 | (2006.01) |

(52) U.S. Cl.
CPC ....... *G06Q 30/0619* (2013.01); *G06F 16/248* (2019.01); *G06F 16/24578* (2019.01); *G06Q 30/0625* (2013.01); *H04M 3/493* (2013.01); *H04M 2203/355* (2013.01)

(58) Field of Classification Search
CPC .................................................. G06Q 30/0619
USPC .......................................................... 707/713
See application file for complete search history.

(56) References Cited

U.S. PATENT DOCUMENTS

| | | | | |
|---|---|---|---|---|
| 8,166,045 | B1 * | 4/2012 | Mazumdar | G06F 16/951 707/748 |
| 8,631,006 | B1 * | 1/2014 | Haveliwala | G06F 16/345 707/732 |
| 8,682,647 | B1 * | 3/2014 | Lee | G06F 16/3329 704/9 |
| 8,762,152 | B2 | 6/2014 | Bennett et al. | |
| 2004/0044952 | A1 | 3/2004 | Jiang et al. | |

(Continued)

FOREIGN PATENT DOCUMENTS

CA 2932385 7/2014

*Primary Examiner* — Syling Yen
(74) *Attorney, Agent, or Firm* — Perkins Coie LLP; Michael Glenn

(57) ABSTRACT

A computer-implemented method and apparatus for facilitating comprehension of user queries during interactions include receiving a query input provided by the user. The one or more query terms in the query input are compared with a plurality of content records stored in a database for at least a partial match in relevancy and each content record is associated with a respective comparison result. A score is generated for each content record based on the respective comparison result and a measure of comprehension between the query input and the plurality of content records. The generation of score for each content record configures a set of scores. A confidence state is determined corresponding to the set of scores and a reply is provided to the user in response to the query input based on the confidence state.

40 Claims, 6 Drawing Sheets

(56) References Cited

U.S. PATENT DOCUMENTS

| | | | | |
|---|---|---|---|---|
| 2014/0188862 A1* | 7/2014 | Campbell | ............. | G06Q 50/01 707/728 |
| 2014/0280292 A1* | 9/2014 | Skinder | ................. | G06Q 10/00 707/767 |
| 2014/0365114 A1* | 12/2014 | van Os | ............. | G01C 21/3632 701/428 |
| 2016/0078374 A1* | 3/2016 | Lippow | ............ | G06F 16/24578 705/5 |

\* cited by examiner

METHOD AND APPARATUS FOR FACILITATING COMPREHENSION OF USER QUERIES DURING INTERACTIONS

CROSS REFERENCE TO RELATED APPLICATIONS

This application claims priority to U.S. provisional patent application Ser. No. 62/172,741, filed Jun. 8, 2015, which is incorporated herein in its entirety by this reference thereto.

TECHNICAL FIELD

The invention generally relates to query response mechanisms, and more particularly to a method and apparatus for facilitating comprehension of user queries during interactions to enable provisioning of improved responses to the users.

BACKGROUND

Users interact with remote entities for a wide range of purposes. For example, a user may interact with a web server hosting a search engine to receive relevant information regarding a query.

In another illustrative example, a user may interact with a customer support agent or a chatbot to receive information about a product or a service, to pay a bill, to resolve a query, to lodge a complaint and the like.

Typically, question and answer (Q&A) matching platforms facilitate such user interactions, where a user query is matched to an appropriate response from among a finite set of stored responses. The matching is primarily performed, among other criteria, based on a match between the words in the user query and the words in each response.

However, in many scenarios, such an approach is found to be limited in its ability to provide users with satisfactory query responses. For example, in some scenarios, a user query may include some words, which are not present in any of the stored responses. In such a situation, the query responses to be provided to the user are selected by matching remaining words in the user query to those in the stored responses. A provisioning of query responses based on matching of only some words in the query may not adequately serve the user's purpose.

In another example scenario, a single user input may include more than one question. In such a case, matching words in the user input to the stored responses in order to identify appropriate responses may result in selecting responses that may not accurately answer any one of the questions in the user input.

The responses provisioned in this manner can be frustrating to the user and may lead to the user abandoning the interaction.

Therefore, there is a need to improve comprehension of user queries vis-à-vis stored responses and provide substantially improved responses to the users.

SUMMARY

In an embodiment of the invention, a computer-implemented method for facilitating comprehension of user queries during interactions is disclosed. The method receives a query input provided by a user. The query input includes one or more query terms. The method compares, by a processor, the one or more query terms with respective content elements in a plurality of content records stored in a database for at least a partial match in relevancy. Each content record from among the plurality of content records is associated with a respective comparison result subsequent to the comparison. The method generates, by the processor, a score for the each content record based on the respective comparison result and a measure of comprehension between the query input and the plurality of content records. The measure of comprehension is determined using respective comparison results for the plurality of content records. The generation of the score for the each content record configures a set of scores. The method determines, by the processor, a confidence state corresponding to the set of scores based on the score for the each content record in the set of scores. The method provides a reply to the user in response to the query input based on the confidence state.

In another embodiment of the invention, an apparatus for facilitating comprehension of user queries during interactions includes at least one processor and a memory. The memory includes a database. The database includes a plurality of content records. The memory stores machine executable instructions therein, that when executed by the at least one processor, causes the apparatus to receive a query input provided by a user. The query input includes one or more query terms. The apparatus compares the one or more query terms with respective content elements in the plurality of content records stored in the database for at least a partial match in relevancy. Each content record from among the plurality of content records is associated with a respective comparison result subsequent to the comparison. The apparatus generates a score for the each content record based on the respective comparison result and a measure of comprehension between the query input and the plurality of content records. The measure of comprehension is determined using respective comparison results for the plurality of content records. The generation of the score for the each content record configures a set of scores. The apparatus determines a confidence state corresponding to the set of scores based on the score for the each content record in the set of scores. The apparatus provides a reply to the user in response to the query input based on the confidence state.

In another embodiment of the invention, a computer-implemented method for facilitating comprehension of user queries during interactions is disclosed. The method receives a natural language query input provided by a user during a voice call interaction between the user and an agent associated with an enterprise. The method converts, by a processor, the natural language query input into textual form to generate one or more query terms. The method compares, by the processor, the one or more query terms with respective content elements in a plurality of content records stored in a database for at least a partial match in relevancy. Each content record from among the plurality of content records is associated with a respective comparison result subsequent to the comparison. The method generates, by the processor, a score for the each content record based on the respective comparison result and a measure of comprehension between the natural language query input and the plurality of content records. The measure of comprehension is determined using respective comparison results for the plurality of content records. The generation of the score for the each content record configures a set of scores. The method determines, by the processor, a confidence state corresponding to the set of scores based on the score for the each content record in the set of scores. The method provides a reply to the user in response to the natural language query input based on the confidence state.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
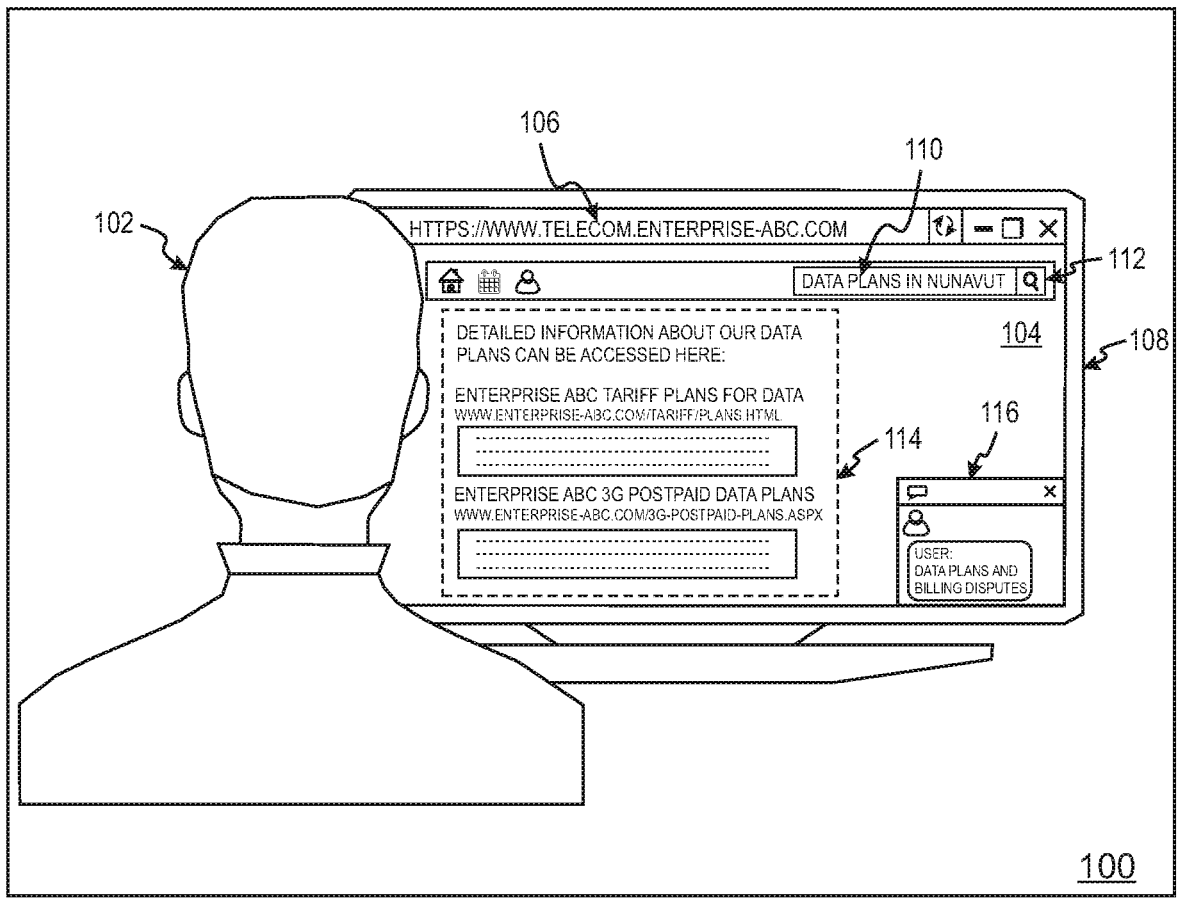
FIG. 1 shows a schematic diagram of a user provisioning a query input using a search interface on a website, in accordance with an example scenario.

FIG. 1 shows a schematic diagram 100 of a user 102 provisioning a query input using a search interface on a website 104, in accordance with an example scenario. The website 104 may be provisioned by an enterprise to offer products, services and/or information to its users. It is understood that the enterprise may be a corporation, an institution, a small/medium sized company or even a brick and mortar entity. For example, the enterprise may be an information search and retrieval service providing company (i.e. a search engine service providing company), a banking enterprise, an educational institution, a financial trading enterprise, an aviation company, a retail outlet or any such public or private sector enterprise.

In the schematic diagram 100, the user 102 is depicted to have accessed the website 104 using a web browser application 106 installed on a desktop computer 108. The website 104 is exemplarily depicted to be associated with a telecommunications enterprise ABC. In an example scenario, the user 102 may be interested in learning about mobile phone data plans being offered by the enterprise ABC in Nunavut region. Accordingly, the user 102 may access the frequently asked questions (FAQ) section of the website 104 to seek the desired information.

If the user 102 is unable to find the desired information on the website 104, then the user 102 may type-in a query 110 including words, such as 'Data plans in Nunavut', in a search box 112 provided on a web page of the website 104. A query response mechanism at a back-end may receive the query 110, parse the words in the query 110 and thereafter execute a matching algorithm to identify one or more documents/web pages including content related to data plans offered by the enterprise ABC stored in a knowledge base. The query response mechanism may further be configured to score each result (i.e. a document or a web page) based on degree of match (or even relevance of match) and generate a ranked list of results and provision the list of results to the user 102 as exemplarily depicted by text section 114.

In a scenario, where the enterprise ABC does not offer mobile data services in the region of Nunavut, the word 'Nunavut' may not be present in any of stored documents/web pages in the knowledge base. In such a situation, the query response mechanism may identify match between remaining words present in the query 110 and the documents, thereby skipping or ignoring the words 'in Nunavut', and provide the list of results to the user 102. Such a provisioning of responses may not serve the user's purpose and may elicit further questions from the user 102. For example, the user 102 may be forced to initiate an interaction with a customer service representative associated with the enterprise ABC on the website 104. In an example scenario, the customer service representative may be embodied as an interactive voice response (IVR) system (not shown in FIG. 1). The user 102 may ask a question, such as for example, 'Is data plan XYZ being offered in Nunavut?' to the IVR system. If the IVR system also employs the same matching algorithm at the back-end to fetch answers to user queries, then the user 102 may have to repeat the question in a different manner to the IVR system. Such an interaction may degrade a quality of user experience and may result in the user 102 abandoning the interaction.

In another example scenario, the user 102 may type-in a query 'data plans and billing disputes' in a chat interface 116 displayed on the website 104. The virtual chat agent may receive the query and employ a query response mechanism at the back-end to identify an appropriate response to the user's query. In an example scenario, the query response mechanism though having identified documents/web pages for 'data plans' and 'billing disputes' may not be able to provision results in a manner where both components of user query are addressed sufficiently. The responses provisioned in such a manner can be frustrating for the user 102.

Various embodiments of the present invention provide methods and apparatuses that are capable of overcoming these and other obstacles and providing additional benefits. More specifically, the method and the apparatuses disclosed herein are capable of overcoming obstacles faced in user interactions conducted using conventional query response mechanisms. The methods and apparatuses suggest a framework for facilitating user interactions in a manner where the user queries are comprehended vis-à-vis responses stored in a knowledge base and substantially improved quality of responses are provided to the users. An example apparatus for facilitating comprehension of user queries during interactions is explained with reference to FIG. 2.

Figure 2:
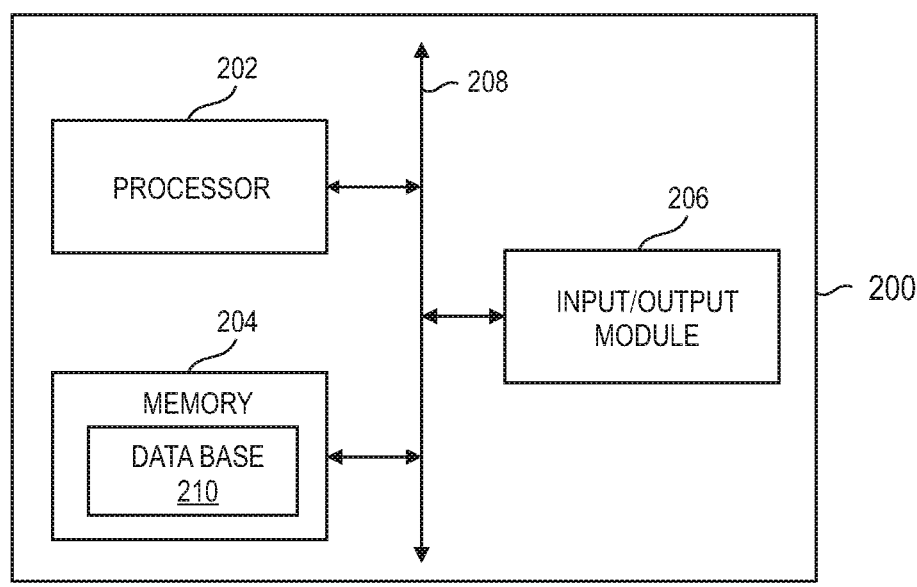
FIG. 2 is a block diagram of an apparatus configured to facilitate comprehension of user queries during interactions, in accordance with an embodiment of the invention.

FIG. 2 is a block diagram of an apparatus 200 configured to facilitate comprehension of user queries during interactions, in accordance with an embodiment of the invention. The term 'user' as used herein refers to either an existing user or a potential user of products, services or information offered by an enterprise. As explained with reference to FIG. 1, the term 'enterprise' may refer to a corporation, an institution, a small/medium sized company or even a brick and mortar entity. For example, the enterprise may be an information search and retrieval service providing company, a banking enterprise, an educational institution, a financial trading enterprise, an aviation company, a consumer goods enterprise or any such public or private sector enterprise. The term 'user queries' or 'query inputs' as used interchangeably herein refers to text enquiries or even spoken enquiries provided by the user during interactions to seek answers thereto. In an illustrative example, a query input may correspond to a text query entered on a search interface on an enterprise website. In another illustrative example, a query input may correspond to a question posed by the user to an enterprise representative, such as for example, a human agent, a chatbot, an interactive voice response (IVR) system etc., during a customer service conversation. Such queries or questions may be associated with respective answers or responses. It is understood that the term 'interaction' or 'user interaction' may relate to any interaction where a query input (whether in textual form or natural language conversational form) elicits a response from among a finite set of stored responses. For example, a text entry on a search interface may result in returning of suitable search results to the user. The search results may be fetched from a database storing answers to various user questions. Such form of communication involving receiving of user queries and provisioning of responses to user queries is referred to herein as interaction. In another illustrative example, a user may pose a question to a chat agent and the chat agent may provision an appropriate response to the user in the chat interface. The appropriate response may be chosen from a finite set of stored responses. The chat conversation involving provisioning of responses to user questions is also referred to herein as interaction.

In FIG. 2, the apparatus 200 is depicted to include at least one processor, such as a processor 202 and a memory 204. It is noted that although the apparatus 200 is depicted to include only one processor, the apparatus 200 may include more number of processors therein. In an embodiment, the memory 204 is capable of storing machine executable instructions. Further, the processor 202 is capable of executing the stored machine executable instructions. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (Blu-Ray® Disc), and semiconductor memories (such as mask ROM, PROM (programmable ROM), EPROM (erasable PROM), flash ROM, RAM (random access memory), etc.).

The apparatus 200 also includes an input/output module 206 (hereinafter referred to as 'I/O module 206') for providing an output and/or receiving an input. The I/O module 206 is configured to be in communication with the processor 202 and the memory 204. Examples of the I/O module 206 include, but are not limited to, an input interface and/or an output interface. Examples of the input interface may include, but are not limited to, a keyboard, a mouse, a joystick, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the processor 202 may include I/O circuitry configured to control at least some functions of one or more elements of the I/O module 206, such as, for example, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the I/O module 206 may be configured to provide a user interface (UI) configured to enable enterprises to utilize the apparatus 200 for facilitating comprehension of user inputs during interactions. Furthermore, the I/O module 206 may be integrated with a monitoring mechanism configured to provide the enterprises with real-time updates/alerts (for example, email notifications, SMS alerts, etc.) of changes to be made to the apparatus 200 for facilitating comprehension of user inputs during interactions.

In an embodiment, various components of the apparatus 200, such as the processor 202, the memory 204 and the I/O module 206 are configured to communicate with each other via or through a centralized circuit system 208. The centralized circuit system 208 may be various devices configured to, among other things, provide or enable communication between the components (202-206) of the apparatus 200. In certain embodiments, the centralized circuit system 208 may be a central printed circuit board (PCB) such as a motherboard, a main board, a system board, or a logic board. The centralized circuit system 208 may also, or alternatively, include other printed circuit assemblies (PCAs) or communication channel media.

It is understood that the apparatus 200 as illustrated and hereinafter described is merely illustrative of an apparatus that could benefit from embodiments of the invention and, therefore, should not be taken to limit the scope of the invention. It is noted that the apparatus 200 may include fewer or more components than those depicted in FIG. 2. In an embodiment, the apparatus 200 may be implemented as a platform including a mix of existing open systems, proprietary systems and third party systems. In another embodiment, the apparatus 200 may be implemented completely as a platform including a set of software layers on top of existing input-response (or question and answer) matching hardware platforms. In an embodiment, one or more components of the apparatus 200 may be deployed in a web server. In another embodiment, the apparatus 200 may be a standalone component in a remote machine connected to a communication network and capable of executing a set of instructions (sequential and/or otherwise) so as to facilitate comprehension of user queries during interactions. For example, the apparatus 200 may be configured to define a framework for facilitating user interactions such that user input is comprehended vis-à-vis stored responses and appropriate responses are provided to the end-user. In some embodiments, the apparatus 200 may be implemented as a centralized apparatus, or, alternatively, the various components of the apparatus 200 may be deployed in a distributed manner while being operatively coupled to each other. In an embodiment, one or more functionalities of the apparatus 200 may also be embodied as a client within devices, such as customers' devices. In another embodiment, the apparatus 200 may be a central system that is shared by or accessible to each of such devices.

In at least one embodiment, the memory 204 is configured to include a knowledge base, such as a database 210. The database 210 stores a plurality of content records. In an illustrative example, the content records may include individual content records in form of a pre-programmed text answer, a text file, an image, a collection of images, a video file, a web page, a set of web pages, a multimedia document or any combination thereof. It is understood that each content record may be associated with a respective address (for example, a logical and a physical address allocated by the apparatus 200) so as to facilitate ease of storing and subsequent retrieval from the database 210. In at least one embodiment, the information included in the content records may serve as answers to various user queries. In an embodiment, the plurality of content records stored in a database 210 may correspond to a particular knowledge domain. For example, all the content records in the database 210 may relate to a banking domain and as such, may include information related to interest rates, credit cards, mortgages, personal loans, saving accounts and the like.

In at least one example embodiment, the processor 202 is configured to, with the content of the memory 204, cause the apparatus 200 to receive query inputs provided by several users of the enterprise. The query inputs may be provided by the users as text inputs on a search interface of the enterprise website, as text inputs during chat conversations with enterprise agents, as natural language speech inputs during voice call interactions with IVR systems and the like. In an embodiment, the I/O module 206 may be communicably associated with web servers hosting web pages of the enterprise website to receive such user queries. Further, the I/O module 206 may also be communicably associated with customer support facility to receive user queries posed during voice conversations and/or chat conversations with various agents of the enterprise. In some embodiments, the I/O module 206 may be in operative communication with various user/agent touch points, such as electronic devices associated with the users, electronic devices associated with customer support representatives (for example, voice-agents, chat—agents, IVR systems, in-store agents, and the like) engaged by the users and the like, to receive user queries therefrom.

It is understood that the user queries may be received from users disposed at several remote geographical locations. Further, the user queries may be received in a textual form or the user queries may be received in a conversational speech form, i.e. a natural language form. In at least some embodiments, the processor 202 of the apparatus 200 may be caused to convert the user queries received in natural language form into textual form using natural language processing techniques that are based on a special grammar that is trained to identify certain keywords more accurately than others. An example of one such grammar type is statistical language models (SLM), which takes into consideration the sequence of words to get the best transcription.

The facilitating of comprehension of user queries during interactions by the apparatus 200 is explained hereinafter with reference to a query input from one user. It is understood that the apparatus 200 is configured to facilitate comprehension of multiple user queries from several other users during their respective interactions in a similar manner.

In at least one example embodiment, a query input received from a user includes one or more query terms. For example, a query input may be 'What are my flight options for air travel to San Francisco on the $28^{th}$ of this month?' As can be seen, such a query input include several words, which are referred to as 'query terms' herein. In some example scenarios, a single query input may include query terms indicative of two or more queries. For example, a query input entered on a search interface may be 'data plans and billing disputes'. In such a case, the query terms imply a user's intention to know more about two disparate areas, i.e. 'data plans' and 'billing disputes' and as such, the query terms may be indicative of two or more queries.

In at least one example embodiment, the processor 202 is configured to, with the content of the memory 204, cause the apparatus 200 to compare one or more query terms in the query input with respective content elements in a plurality of content records stored in the database 210 for at least a partial match in relevancy. As explained above, a plurality of content records are stored in the database 210. Each content record may include several content elements, such as text portions, images, infographics etc. In at least one embodiment, the database 210 may store the content elements in an indexed form to enable ease of search and retrieval. In order to compare the query terms in the query input with the content elements in the content records, the apparatus 200 is caused to parse the query input into individual query terms and generate n-grams, for example unigrams, bi-grams, trigrams etc., from the individual query terms. For example, if a query input includes query terms Q1, Q2, Q3 and Q4, then in one embodiment, the apparatus 200 may be caused to parse the query input and generate unigrams such as Q1, Q2, Q3 and Q4; bigrams such as Q1Q2 and Q3Q4; trigrams such as Q1Q2Q3 and Q2Q3Q4; and an n-gram such as Q1Q2Q3Q4. Further, the apparatus 200 is further caused to compare the n-grams with the content elements in the content records for at least a partial match in the relevancy. More specifically, in many scenarios, in addition to trying to identify an exact match between the content elements and the n-grams, the apparatus 200 may be caused to identify a partial match (for example, an interchanged sequence of terms in an n-gram), or in some cases, a match using similar meaning words (for example, the terms 'bill' 'invoice' and 'payment' may be interchangeably used, or the terms 'flight' and 'air travel' may be used interchangeably) etc., between the content elements and the n-grams. Such a comparison is performed to identify content records including information that is at least partially relevant to the query input. Further, the apparatus 200 is caused to associate each content record with a respective comparison result subsequent to the comparison. More specifically, subsequent to comparison of content elements in a content record with the n-grams generated from the query input, the result of the comparison may be associated with the content record. For example, in some embodiments, a frequency of occurrence for each n-gram in the content record may be computed and stored as a part of the comparison result. In an illustrative example, if a query input received from a user corresponds to following input: 'redemption of reward points', then for each n-gram generated from the query input, such as for example, 'redemption', 'reward', 'points', 'reward points', 'redemption of reward points', a frequency of occurrence of each n-gram in a content record may be determined and stored in the memory 204 as a comparison result for the content record.

In at least one example embodiment, the processor 202 is configured to, with the content of the memory 204, cause the apparatus 200 to generate a score for the each content record based on the respective comparison result and a measure of comprehension between the query input and the plurality of content records. The measure of comprehension between the query input and the plurality of content records may be determined using respective comparison results for the plurality of content records. In an embodiment, the measure of comprehension between the query input and the plurality of content records is determined, at least in part, based on a spread of relevancy matching content elements for each query term of the query input in the plurality of content records stored in the database 210. More specifically, the determination of the measure of comprehension not only takes into account the presence of query terms of a query input in a content record of the database 210 but also takes into account words in the query input that are not present in any content record of the database 210. It is noted herein that most conventional techniques only score a match based on a measure of a maximal fractional overlap between the query terms and the Boolean criteria for each content record in a knowledge base, such as the database 210. However, the apparatus 200 is configured to calculate a score not only based on overlap between query terms and content elements in the individual content records in the database 210 (i.e. unidirectional manner of score determination) but also on criteria such as whether the query terms are present in the database 210 at all or not (i.e. bi-directional manner of score determination). Such bi-directional manner of score calculation takes into account scenarios where only partial number of query terms in the query input could be understood by the database 210 or scenarios where no query terms in the query input could be understood by the database 210. In other words, the bi-directional manner of score determination scores not only based on presence of words of a query element in a content record of the database 210 but also takes into account words in the query input that are not present in any content record of the database 210.

In at least one example embodiment, a term frequency—inverse document frequency (TF-IDF) statistical technique may be employed to determine an importance of each query term and thereby identify relevant content records based on the frequency/presence of the important query terms therein. In an illustrative example, for the query input 'data plans in Nunavut', the query terms 'data' and 'in' may be rated to be relatively less important than the query terms 'Nunavut' and 'data plans'. In an example scenario, for the query input 'data plans in Nunavut', all content records related to 'data plans' may be rated high in importance as a response to the query input, as their TF-IDF value is high. If the query term 'Nunavut' is identified to be present in the 'data plans' related content records, then a measure of comprehension between the query terms and the content records in the database 210 may be considered to be high. However, if the query term 'Nunavut' is identified to be present in the content records of the database 210 but not in the content records related to 'data plans' then it may be inferred that the database 210 understands the query terms however a matching result is not available. In such a scenario, the measure of comprehension may be lower than the scenario, where the query term 'Nunavut' was identified in the 'data plans' related content records. If the query term 'Nunavut' is not present in any content record of the database 210, then it may be inferred that the database 210 does not understand a query term and the measure of comprehension may be considered to be low. Accordingly, based on the occurrence of the query terms in the various content records of the database 210, i.e. based on the spread of the relevancy matching content records, a measure of comprehension may be determined to be 'High', 'Low', Medium' etc.

In an embodiment, based on the measure of comprehension and the respective comparison results for the each content record, a score may be generated for the each content record. For example, if the measure of comprehension is high and an exact match of n-grams are identified multiple times in a content record, then a score of 0.9 (i.e. a score closer to 1) may be generated based on the frequency of individual query terms vis-à-vis their frequency in other content records. In another illustrative example, if the measure of comprehension is low and a partial relevancy match of n-grams is identified in a content record, then a score of 0.4 (i.e. a lower score) may be generated for the content record.

In an embodiment, the score generated for the each content record is an absolute value capable of being compared with scores generated for remaining content records in response to a plurality of query inputs. For example, the scores generated for each content record may assume a value between '0' and '1' thereby enabling comparison of scores for content records for one query input against scores for other query inputs received from several users so as to determine which user queries are answered better. It is noted that in conventional Q&A matching platforms, scores calculated for each response (with respect to a user query) are relative values (i.e. only relevant within the set of scores for that query) thereby precluding any comparison between or across different queries. In an illustrative example, consider a scenario, where the query input of a first user includes terms 'data plans in Nunavut' and a query input of a second user includes just the terms 'data plans'. In a scenario, where the database 210 does not include any content record referring to the query term 'Nunavut', the query 'data plans in Nunavut' will score a lower comprehension than just 'data plans' even though their TF-IDF for a particular content record may be equal. More specifically, even though the query term 'Nunavut' is not required for a successful match, it is a query term that is remaining unhandled. The scores may therefore provide a sense of how well the user queries are being comprehended and responded to. The scores may be measured across queries over time to understand the accuracy performance of the query response system as a whole.

In an embodiment, generation of the score for the each content record configures a set of scores. More specifically, since a score is generated for each content record from among the plurality of content records, a set of scores corresponding to the plurality of content records is configured.

In at least one example embodiment, the processor 202 is configured to, with the content of the memory 204, cause the apparatus 200 to determine a confidence state corresponding to the set of scores. The confidence state is determined based on the score for the each content record in the set of scores.

Some non-limiting examples of confidence states determined by the apparatus 200 include 'Confident one right answer', 'Needs clarification', 'Tentative one right answer' or 'Multiple tentative answers', 'Multiple User Questions', 'Confident out of scope', and the like. The various confidence states listed herein are exemplary in nature and it is understood that the apparatus 200 may be caused to define various such confidence states. The determination of a confidence state based on the set of scores is further explained below.

In an embodiment, the processor 200 of the apparatus 200 may employ one or more predefined thresholds in order to determine the confidence state associated with the set of scores. In an illustrative example, if a score for a content record is greater than a first predefined threshold value and scores for remaining content records are less than a second predefined threshold value, then the confidence state indicating identification of one right answer (i.e. confident one right answer) corresponding to the query input is determined. For example, the apparatus 200 may define a criterion that if a content record is associated with a score above a certain pre-set threshold, i.e. a first predefined threshold value of 0.85, then the content record may be interpreted to be adhering to a measure of completeness (with reference to the query input), or more specifically, the content record comprehensively addresses the query input from the user. In a scenario, where one content record is associated with a score of 0.9 and if the remaining content records are associated with scores below a certain pre-set threshold, i.e. second predefined threshold value of 0.6, then the confidence state may be determined to be 'one right answer' or 'confident one right answer'. In an embodiment, the apparatus 200 is caused to effect display of the content record associated with the score greater then the first predefined threshold value along with a text snippet to the user. The provisioning of the text snippet will be explained in greater detail later.

In an embodiment, if scores for two or more content records from among the plurality of content records are determined to be to be less than or equal to a second predefined threshold value (for example, a value of 0.6) and greater than or equal to a third predefined threshold value (for example, a value of 0.4), then the confidence state indicating identification of multiple tentative answers corresponding to the query input is determined, or, more specifically, a confidence state of 'tentative one right answer' is determined.

In an embodiment, if scores for two or more content records from among the plurality of content records are greater than or equal to a fourth predefined threshold value (for example, a value of 0.7) and scores for remaining content records from among the plurality of content records are less than or equal to a second predefined threshold value (for example, a value of 0.6), then the confidence state indicating identification of multiple user questions in the query input is determined, or, more specifically, a confidence state of 'multiple user questions' or 'multiple intentions' is determined.

In an embodiment, if respective scores for the plurality of content records are less than a fifth predefined threshold value (for example, a value of 0.2), then the confidence state indicating an irrelevant query input is determined, or more specifically, a confidence state of 'confident out of scope' is determined.

It is understood that the various predefined threshold values are mentioned herein for example purposes and that the apparatus 200 may be caused to define and correct the predefined threshold values using experimental or heuristic techniques and/or actual observed effect of the choice of the threshold values on the experience afforded to the users.

In at least one example embodiment, the processor 202 is configured to, with the content of the memory 204, cause the apparatus 200 to provide a reply to the user in response to the query input based on the confidence state. In an embodiment, providing the reply to the user includes generating an instruction based on the determined confidence state. In an embodiment, the processor 202 of the apparatus 200 may be configured to generate the instruction based on the confidence state and provision the instruction to the I/O module 206. The I/O module 206 may be configured to provision the reply to the user based on the instruction. In an embodiment, the I/O module 206 may be configured to select a text snippet from among a plurality of text snippets stored in the database 210 based on the generated instruction. In at least one embodiment, the text snippet configures, at least in part, the reply provided to the user. More specifically, in some embodiments, only the text snippet is provided to the user as the reply, whereas in some embodiments, the text snippet is provided to the user along with the one or more content records selected from the database 210 based on the respective scores, as the reply. In an embodiment, the one or more content records may be provided to the user in an 'as-is' form (for example, when a content record corresponds to a pre-programmed text answer) or location pointers, such as uniform resource locators (URLs) associated with the respective content records may be provisioned to the user (for example, when the content records corresponds to a web page or a text document hosted on a server).

In an illustrative example, if the confidence state is determined to be 'confident one right answer' or 'one right answer', then the apparatus 200 may be caused to generate an instruction to display the content record. Further, a text snippet including text such as 'We're confident the following is the answer to your question' may be selected from among a plurality of text snippets stored in the database 210. It is understood that the plurality of text snippets are stored in the database 210 to serve as probable responses to various user queries. The apparatus 200 may further be caused to provide the text snippet to the user along with the content record associated with the score above the first predefined threshold value. In some cases, the apparatus 200 may be caused to provide the content record (or the one right answer) along with one or more content records and the following text snippet 'We believe this is the answer to your question. If not, try remaining answer suggestions below'. The other content records may be chosen based on their respective scores, which reflect that they include content which is not good enough to be the one right answer, but, are above a certain pre-set threshold of relevance so as to be of interest to the user.

In an illustrative example, if the confidence state is determined to be 'tentative one right answer' or 'multiple tentative answers', then the apparatus 200 may be caused to generate an instruction 'Implicit disambiguation' (i.e. the user needs to be requested to disambiguate the query). Further, a text snippet such as 'We're not 100% sure of the answer to your question, but we think it might be among the following answers' or 'We don't seem to have a good match to your question. The following suggested answers are somewhat relevant' may be selected from among a plurality of text snippets stored in the database 210. The apparatus 200 may further be caused to provide the text snippet to the user along with two or more content records selected from content records associated with the scores less than or equal to the second predefined threshold value but greater than or equal to the third predefined threshold value.

In an illustrative example, if the confidence state is determined to be 'multiple user questions', or 'multiple intentions', then the apparatus 200 may be caused to generate an instruction 'Explicit disambiguation' (i.e. the user needs to be explicitly requested to disambiguate the query). Further, a text snippet such as 'we believe that you have asked about multiple things. Here is the information for each of them' may be selected from among a plurality of text snippets stored in the database 210. The apparatus 200 may further be caused to provide the text snippet to the user along with two or more content records selected from content records associated with the scores greater than or equal to a fourth predefined threshold value. In some embodiments, the text snippet may be configured to request the user to provide a subsequent query input comprising a single question, such that one right answer may be identified accurately.

In an illustrative example, if the confidence state is determined to be 'confident out of scope', then the apparatus 200 may be caused to generate an instruction 'Needs clarification'. In an embodiment, a text snippet is configured to request the user to provide a relevant query input, or a text snippet including an offer to interact with an agent may be selected from among the plurality of text snippets stored in the database 210. For example, a text snippet such as 'we're sorry, but your question seems to be from a different area than [banking]' or 'we do not completely understand your question. Please either reword it or click "Escalate" to speak to an agent', may be selected from among a plurality of text snippets stored in the database 210. The apparatus 200 may further be caused to provide only the text snippet to the user.

It is noted that conventional query response matching techniques provide replies to the user based almost solely on the scores of the content record(s) with the maximal matching score. However, the apparatus 200 is configured to utilize the entire set of scores (i.e., for each possible content record) together to provide a follow-on action (through the confidence state). The provisioning of a reply to a query input is further explained with reference to a schematic diagram in FIG. 3.

Figure 3:
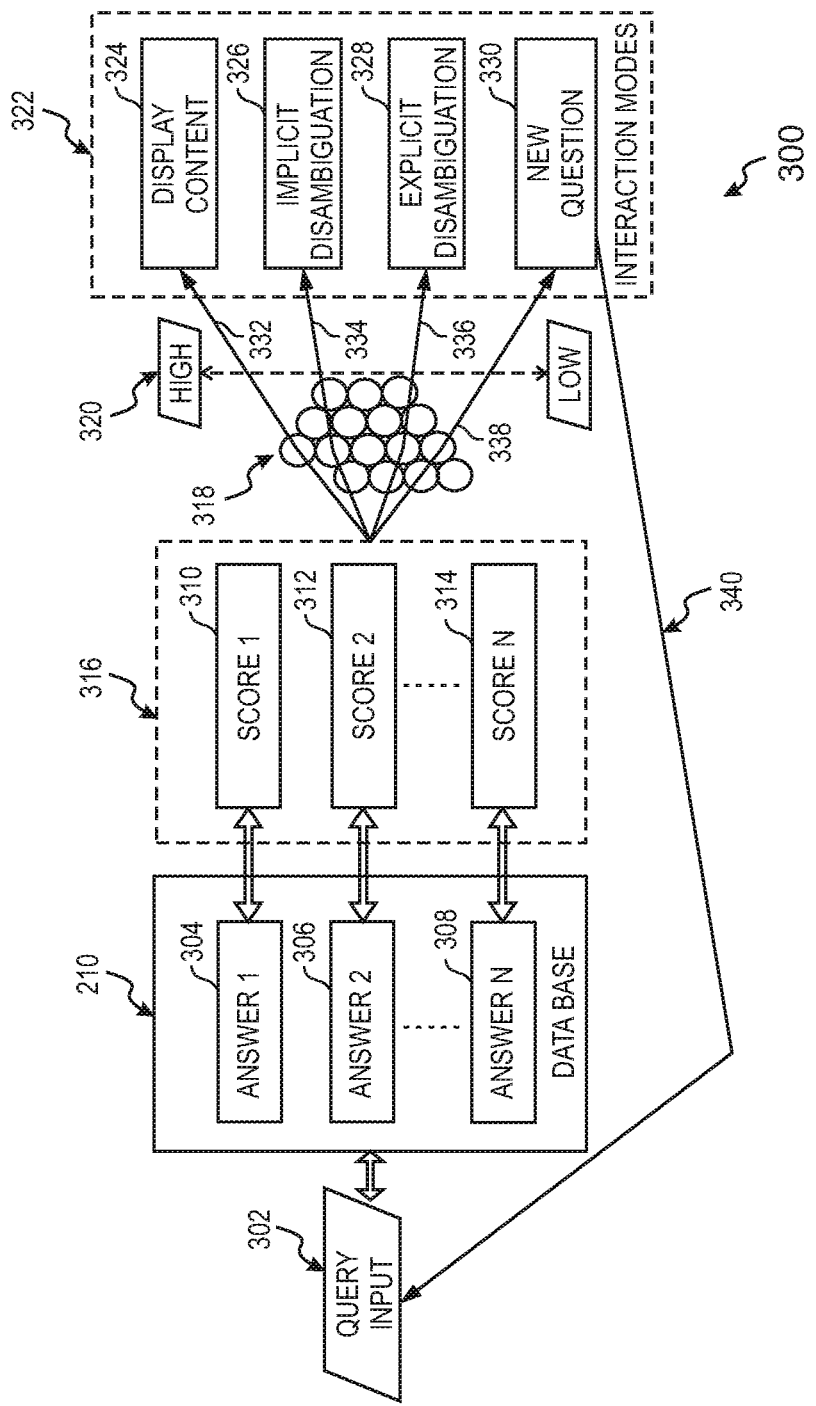
FIG. 3 shows a schematic diagram for illustrating a process flow executed by the apparatus of FIG. 2 for provisioning a reply to a user in response to a query input received from the user, in accordance with an embodiment of the invention.

FIG. 3 shows a schematic diagram for illustrating a process flow 300 executed by the apparatus 200 of FIG. 2 for provisioning a reply to a user in response to a query input 302 received from the user, in accordance with an embodiment of the invention. It is noted that only one component of the apparatus 200, i.e. the database 210 is depicted in the schematic diagram. However, it is understood that the apparatus 200 includes the processor 202, I/O module 206 and the centralized circuit system 208 as explained with reference to FIG. 2.

The process flow 300 depicted in the schematic diagram shows that the query input 302 is initially compared with content records in the database 210. More specifically, the query terms in the query input are compared with content elements in individual content records. For the sake of description, the content record, which may be a pre-programmed text answer, a text file, an image or even a textual line, is referred to herein as a 'probable answer' or just as an 'answer'. Accordingly, the database 210 is depicted to include answers, such as answers 304, 306 and 308 (also depicted as 'ANSWER 1', 'ANSWER 2' and 'ANSWER N', respectively, in the schematic diagram). Further, as explained with reference to FIG. 2, each content record, (i.e. each answer in this case) is associated with the comparison result subsequent to the comparison.

The processor 202 of the apparatus 200 is configured to generate a score for each answer in the database 210. Accordingly, scores 310, 312 and 314 (also depicted as 'SCORE 1', 'SCORE 2' AND 'SCORE N', respectively, in the schematic diagram 300) are generated corresponding to the answers 304, 306 and 308, respectively. The scores generated for answers in the database 210 together configure a set of scores 316.

As explained with reference to FIG. 2, the processor 202 is capable of determining a confidence state from among a plurality of predefined confidence states, such as 'confident one right answer', 'multiple tentative answers', 'multiple user questions', 'confident out of scope', 'needs clarification' and the like. In the schematic diagram 300, the plurality of confidence states is depicted as a cluster 318 including a number of spherical elements, with each spherical element representing a confidence state. Further, the cluster 318 is associated with a scale 320 indicative of a confidence level from 'High' to 'Low' corresponding to the confidence states. As explained with reference to FIG. 2, an appropriate reply may be provisioned by the I/O module 206 based on the determination of the confidence state determined for the set of scores 316 by the processor 202. Accordingly, initially an intermediate step of 'how to proceed' for a given confidence state is determined by the processor 202 and an instruction to that effect is provided to the I/O module 206 in order to provision the appropriate response to the user. The intermediate step is exemplarily depicted in form of 'interaction modes' 322 including possible modes of interaction with the user as 'DISPLAY CONTENT' 324, 'IMPLICIT DISAMBIGUATION' 326, 'EXPLICIT DISAMBIGUATION 328' and 'NEW QUESTION 330'. Accordingly, if the confidence state associated with the set of scores 316 is very high (as measured using the scale 320), a scenario exemplarily depicted using a pointed arrow 332, implying that the user question can be addressed by one right answer or an answer with maximal score, then the interaction mode selected in such a case would be to 'DISPLAY CONTENT' 324, or in other words to display the one right answer (with or without the suggested answers, i.e. answers with non maximal scores). In a scenario where confidence state associated with the set of scores 316 is high but not higher than a certain pre-set threshold, i.e. less than or equal to a second predefined threshold value and greater than or equal to a third predefined threshold value, as exemplarily depicted using a pointed arrow 334, implying that there is no right 'one answer' to the user question but more than one tentative answer. In such a case, the interaction mode selected would be 'IMPLICIT DISAMBIGUATION' 326, or in other words, one or more suggested answers are provided to the user with the text snippet such as 'We're not 100% sure of the answer to your question, but we think it might be among the following answers' or 'We don't seem to have a good match to your question. The following suggested answers are somewhat relevant'.

In a scenario where confidence state associated with the set of scores 316 is low but not less than a certain pre-set threshold (i.e. two or more answers are associated with scores greater than or equal to a fourth predefined threshold and the remaining answers are associated with scores less than or equal to a second predefined threshold value), as exemplarily depicted using a pointed arrow 336, implying that there are multiple answers with similar low scores. In such a case, the interaction mode selected would be 'EXPLICIT DISAMBIGUATION' 328, or in other words, one or more suggested answers are provided to the user with the text snippet such as 'we believe that you asked about multiple things. Here is the information for each of them'. In a scenario where confidence state associated with the set of scores 316 is less than a certain pre-set threshold (i.e. less than a fifth predefined threshold value), as exemplarily depicted using a pointed arrow 338, implying that all answers are associated with comprehension scores less than a pre-set threshold. In such a case, the interaction mode selected would be 'NEW QUESTION' 330, or in other words, the user may be requested for more information (as depicted by pointed arrow 340) and accordingly provided with only guidance text such as for example: 'we're sorry, but your question seems to be from a different area than [banking]' or 'we do not completely understand your question. Please either reword it or click "Escalate" to speak to an agent'. Based on the selected interaction mode an appropriate response is thus provided to the user, thereby substantially improving a quality of user interaction. The provisioning of an appropriate reply to the user in response to the received query input based on the confidence state is further explained with help of illustrative examples in FIG. 4 and FIG. 5.

Figure 4:
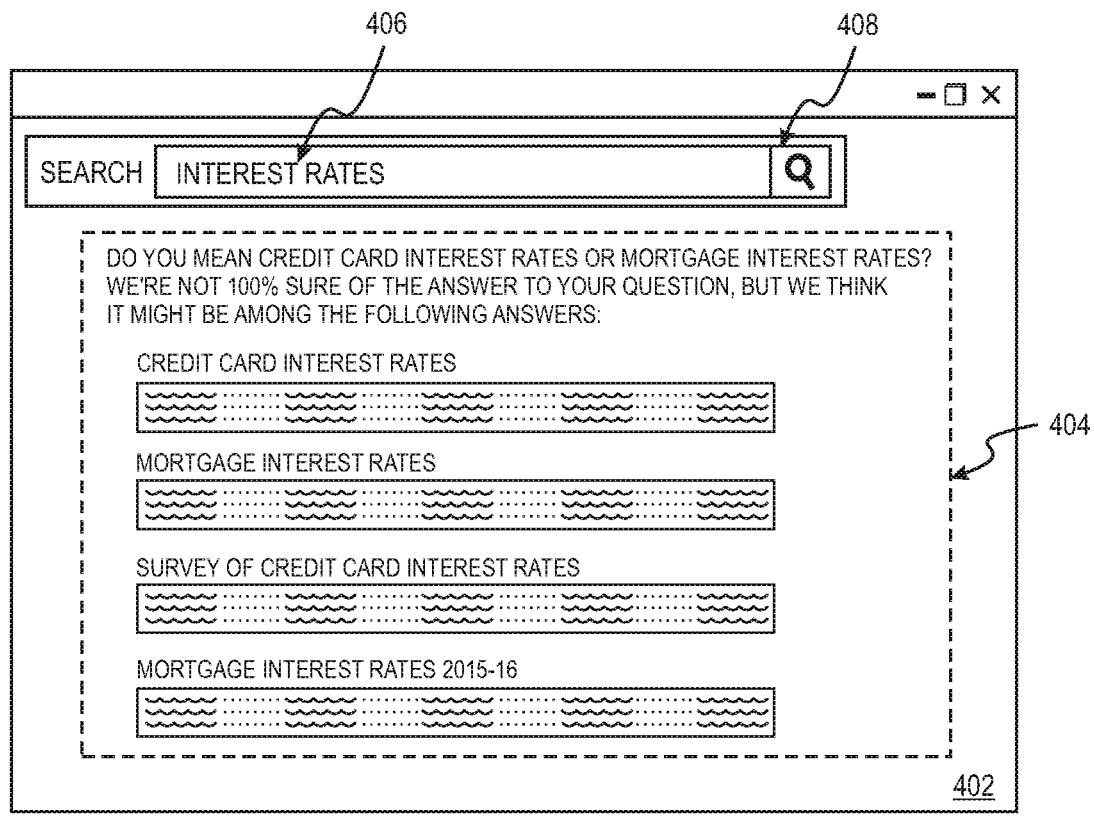
FIG. 4 shows a simplified representation of a user interface for illustrating a reply displayed to a user in response to the user' query input, in accordance with an embodiment of the invention.

FIG. 4 shows a simplified representation of a user interface 402 for illustrating a reply 404 displayed to a user in response to a user' query input 406, in accordance with an embodiment of the invention. In an example scenario, the simplified user interface 402 may correspond to a portion of a web page of a banking website including a search interface in form of a search box 408. The user may provide the query input 406 including text 'interest rates' in the search box 408. As explained with reference to FIG. 2, the I/O module 206 of the apparatus 200 may be communicably associated with web servers hosting web pages of enterprise website, such as the banking website. The web servers may be configured to track and capture user activity on the website, such as for example by using tags like HTML tags and JavaScript tags (or in some case, using socket connections) and provision the captured information, such as the query input 406, in substantially real-time (i.e. with very minimal delay in order of milliseconds) to the I/O module 206 of the apparatus 200.

In an embodiment, the processor 202 of the apparatus 200 may be configured to receive the query input 406 from the I/O module 206 either directly, or via the memory 204, and parse the query input to generate n-grams as explained with reference to FIG. 2. The processor 202 may further be configured to compare the n-grams with the content elements of the content records stored in the database 210 for at least a partial match in relevancy. In an example scenario, the database 210 may be embodied as banking domain knowledge base and as such store content records related to variety of questions on current interest rates for credit cards, mortgages, personal loans, and savings accounts. Based on the result of the comparison between the query elements and the content elements in the content records, the processor 202 may be configured to generate a score for each content record. In an example scenario, the scores calculated by the processor 202 are such that there are four content records with scores in the range of 0.5 to 0.6 range and then no other content record with a score of above 0.2 value. The processor 202 may analyze this set of scores and determine that the appropriate confidence state is 'Needs Clarification'—that is, that to answer the user's question confidently, more information needs to be retrieved from the user. In an example scenario, the confidence state, the individual scores and other match heuristics are sent to a I/O module 206 with the instruction which then determines how to get the additional information (e.g., by listing the four content record titles, by compiling a general 'Tell me more' response, or by compiling a specific text snippet 'Do you mean credit cards, mortgages, etc.' reply as depicted in by the reply 404.

Figure 5:
FIG. 5 shows a simplified representation of a chat interface illustrating a reply displayed to a user in response to the user's query input, in accordance with an embodiment of the invention.

FIG. 5 shows a simplified representation of a chat interface 502 illustrating a reply 504 displayed to a user in response to the user's query input 506, in accordance with an embodiment of the invention. In an example scenario, the chat interface 502 may correspond to a chat application displayed on an enterprise website for facilitating user interaction with customer support representatives (i.e. agents of the enterprise) for assisting the users with their respective needs.

The user may provide the query input 506 including text 'How do I get a second card for my wife and improve my interest rate?' in the chat interface 502. As explained with reference to FIG. 2, the I/O module 206 of the apparatus 200 may be communicably associated with customer support facility and receive information from agent touch points, such as agent chat interfaces to receive information, such as the query input 506, in substantially real-time (i.e. with very minimal delay in order of milliseconds) to the I/O module 206 of the apparatus 200.

In an embodiment, the processor 202 of the apparatus 200 may be configured to receive the query input 506 from the I/O module 206 either directly, or via the memory 204, and parse the query input to generate n-grams as explained with reference to FIG. 2. The processor 202 may further be configured to compare the n-grams with the content elements of the content records stored in the database 210 for at least a partial match in relevancy. Based on the result of the comparison between the query elements and the content elements in the content records, the processor 202 may be configured to generate a score for each content record. In an example scenario, the scores calculated by the processor 202 are such that two content records score very high (for example, their respective scores are greater than 0.9) and then no other answer is associated with a score higher than 0.6. The processor 202 may examine the two high-scoring content records and find that the terms that match from their individual criteria do not overlap. The processor 202 in such a case may determine the appropriate confidence state to be 'multiple user questions' (or even 'multiple intentions' as explained earlier) and generate an instruction 'Implicit Disambiguation' to the I/O module 206, which may then based on the scores and the instruction select a text snippet 'We have two separate answers to your query' and provision the content records along with the text snippet to the user as the reply 506 as depicted in FIG. 5.

A method for facilitating comprehension of user queries during interactions is explained with reference to FIG. 6.

Figure 6:
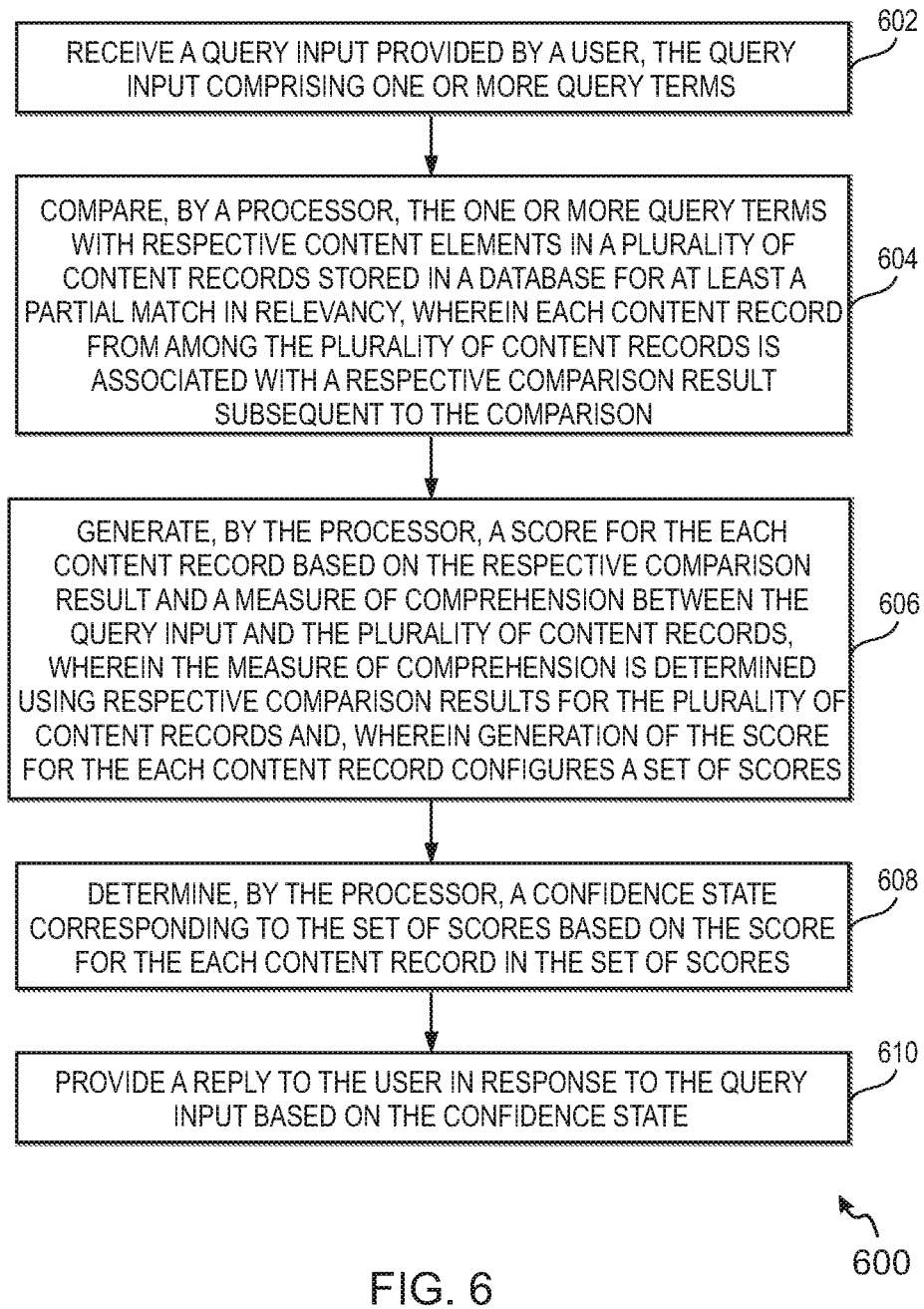
FIG. 6 is a flow diagram of an example method for facilitating comprehension of user queries during interactions, in accordance with an embodiment of the invention.

FIG. 6 is a flow diagram of an example method 600 for facilitating comprehension of user queries during interactions, in accordance with an embodiment of the invention. The method 600 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. One or more operations of the method 600 are described herein with help of a processor, such as the processor 102 of the apparatus 200. It is noted that, the operations of the method 600 can be described and/or practiced by using an apparatus other than the apparatus 200. The method 600 starts at operation 602.

At operation 602 of the method 600, a query input provided by a user is received. The query input may be provided by the user as a text input on a search interface of the enterprise website, as a text input during a chat conversation with an enterprise agent, as a natural language speech input during a voice call interaction with an IVR system and the like. The query input includes one or more query terms. For example, a query input may be 'How do I cancel my add-on card'. As can be seen, such a query input include several words, which are referred to as 'query terms' herein. In some example scenarios, a single query input may include query terms indicative of two or more queries. For example, a query input entered on a search interface may be 'credit ratings and redeeming points'. In such a case, the query terms imply a user's intention to know more about two disparate areas, i.e. 'credit ratings' and 'redeeming points' and as such, the query terms may be indicative of two or more queries.

At operation 604 of the method 600, the one or more query terms are compared by the processor with respective content elements in a plurality of content records stored in a database for at least a partial match in relevancy. As explained with reference to FIG. 2, each content record may include several content elements, such as text portions, images, infographics etc. In at least one embodiment, the database may store the content elements in an indexed form to enable ease of search and retrieval. In order to compare the query terms in the query input with the content elements in the content records, the query input may be parsed into individual query terms and n-grams, such as for example unigrams, bi-grams, trigrams, etc., may be generated from the individual query terms.

The n-grams may then be compared with the content elements in the content records for at least a partial match in the relevancy. More specifically, in many scenarios, in addition to trying to identify an exact match between the content elements and the n-grams, a partial match (for example, an interchanged sequence of terms in an n-gram), or in some cases, a match using similar meaning words (for example, the terms 'bill' 'invoice' and 'payment' may be interchangeably used, or the terms 'flight' and 'air travel' may be used interchangeably) etc., may be identified between the content elements and the n-grams. Such a comparison is performed to identify content records including information that is at least partially relevant to the query input.

Further, each content record is associated with a respective comparison result subsequent to the comparison. More specifically, subsequent to comparison of content elements in a content record with the n-grams generated from the query input, the result of the comparison may be associated with the content record. For example, in some embodiments, a frequency of occurrence for each n-gram in a content record may be computed and stored as a part of the comparison result for the content record.

At operation 606 of the method 600, a score is generated by the processor for the each content record based on the respective comparison result and a measure of comprehension between the query input and the plurality of content records. In an embodiment, the measure of comprehension between the query input and the plurality of content records is determined, at least in part, based on a spread of relevancy matching content elements for each query term of the query input in the plurality of content records stored in the database. More specifically, the determination of the measure of comprehension not only takes into account the presence of query terms of a query input in a content record of the database but also takes into account words in the query input that are not present in any content record of the database.

As explained with reference to FIG. 2, a TF-IDF statistical technique may be employed to determine an importance of each query term and thereby identify relevant content records based on the frequency/presence of the important query terms therein. In an illustrative example, for the query input 'transparent solar power cell', from the TF-IDF statistical technique, the query term 'transparent' may be determined to be higher in importance to other words in the query input such as 'solar' and 'power' for example. In an example scenario, for the query input 'transparent solar power cell', all content records related to 'solar power cells' may be rated high in importance as a response to the query input, as their TF-IDF value is high. If the query term 'transparent' is identified to be present in the 'solar power cells' related content records, then a measure of comprehension between the query terms and the content records in the database may be considered to be high. However, if the query term 'transparent' is identified to be present in the content records of the database but not in the content records related to 'solar power cells' then it may be inferred that the database understands the query terms however a matching result is not available. In such a scenario, the measure of comprehension may be lower than the scenario, where the query term 'transparent' was identified in the 'solar power cells' related content records. If the query term 'transparent' is not present in any content record of the database, then it may be inferred that the database does not understand a query term and the measure of comprehension may be considered to be low. Accordingly, based on the occurrence of the query terms in the various content records of the database 210, i.e. based on the spread of the relevancy matching content records, a measure of comprehension may be determined to be 'High', 'Low', 'Medium' etc.

In an embodiment, based on the measure of comprehension and the respective comparison results for the each content record, a score may be generated for the each content record. For example, if the measure of comprehension is high and an exact match of n-grams are identified multiple times in a content record, then a score of 0.9 (i.e. a score closer to 1) may be generated based on the frequency of individual query terms vis-à-vis their frequency in other content records. In another illustrative example, if the measure of comprehension is low and a partial relevancy match of n-grams is identified in a content record, then a score of 0.4 (i.e. a lower score) may be generated for the content record.

At operation 608 of the method 600, a confidence state corresponding to the set of scores is determined by the processor based on the score for the each content record in the set of scores. In an illustrative example, if a score for a content record is greater than a first predefined threshold value (for example, a value of 0.85) and scores for remaining content records are less than a second predefined threshold value (for example, a value of 0.6), then the confidence state indicating identification of one right answer (i.e. confident one right answer) corresponding to the query input is determined. In another illustrative example, if scores for two or more content records from among the plurality of content records are determined to be to be less than or equal to a second predefined threshold value (for example, a value of 0.6) and greater than or equal to a third predefined threshold value (for example, a value of 0.4), then the confidence state indicating identification of multiple tentative answers corresponding to the query input is determined, or, more specifically, a confidence state of 'tentative one right answer' is determined.

In an embodiment, if scores for two or more content records from among the plurality of content records are greater than or equal to a fourth predefined threshold value (for example, a value of 0.7) and scores for remaining content records from among the plurality of content records are less than or equal to a second predefined threshold value (for example, a value of 0.6), then the confidence state indicating identification of multiple user questions in the query input is determined, or, more specifically, a confidence state of 'multiple user questions' or 'multiple intentions' is determined. In an embodiment, if respective scores for the plurality of content records are less than a fifth predefined threshold value (for example, a value of 0.2), then the confidence state indicating an irrelevant query input is determined, or more specifically, a confidence state of 'confident out of scope' is determined. It is understood that the various predefined threshold values are mentioned herein for example purposes and that the predefined threshold values may be defined and corrected using experimental or heuristic techniques and/or actual observed effect of the choice of the threshold values on the experience afforded to the users.

At operation 610 of the method 600, a reply is provided to the user in response to the query input based on the confidence state. In an embodiment, providing the reply to the user includes generating an instruction based on the determined confidence state. In an embodiment, a text snippet from among a plurality of text snippets stored in the database may be selected based on the generated instruction. In at least one embodiment, the text snippet configures, at least in part, the reply provided to the user. More specifically, in some embodiments, only the text snippet is provided to the user as the reply, whereas in some embodiments, the text snippet is provided to the user along with the one or more content records selected from the database based on the respective scores, as the reply. The provisioning of reply including the text snippet is explained with reference to FIGS. 2, 4 and 5 and is not explained herein.

The method 600 stops at operation 610. Another method for facilitating comprehension of user queries during interactions is explained with reference to FIG. 7.

Figure 7:
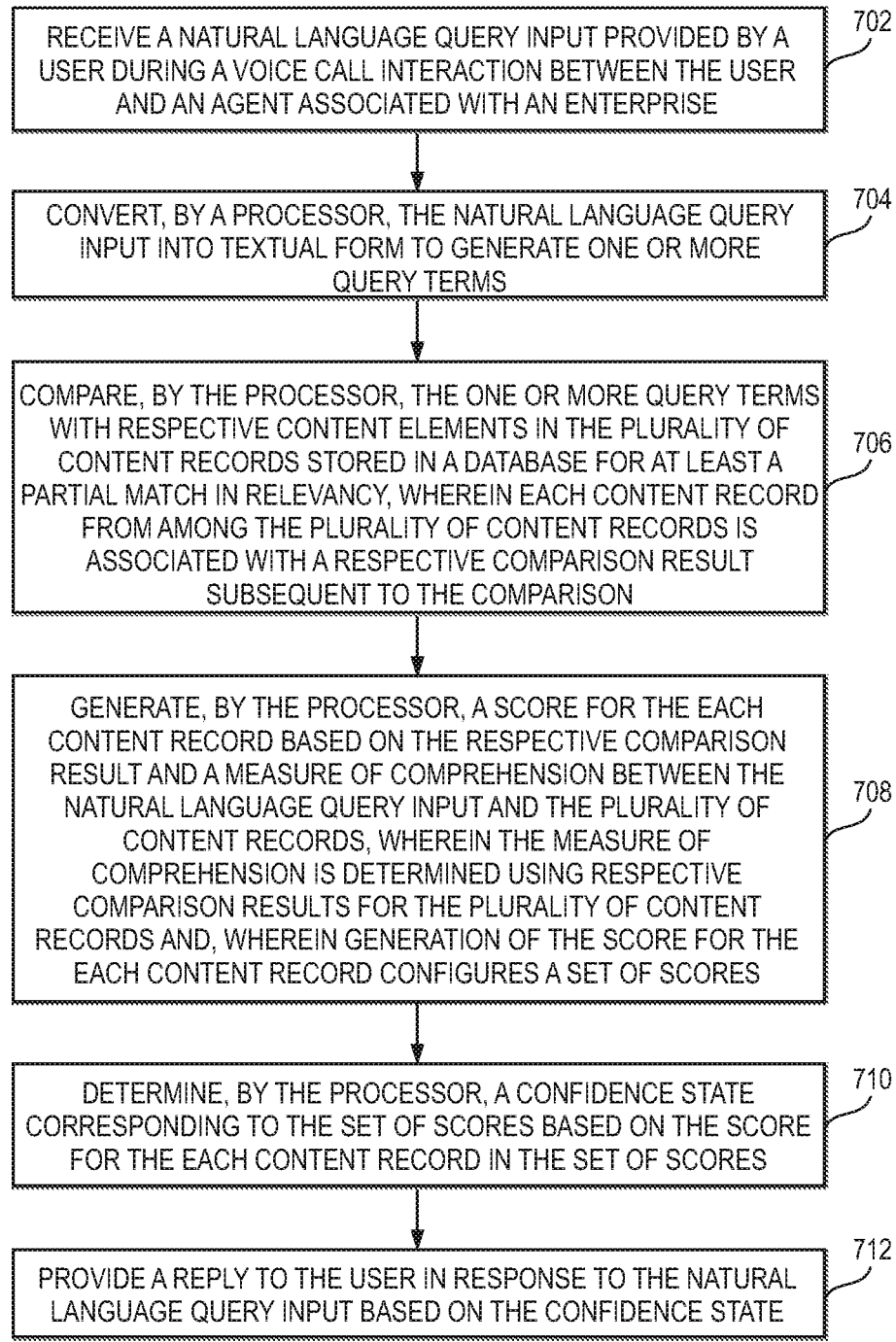
FIG. 7 is a flow diagram of an example method for facilitating comprehension of user queries during interactions, in accordance with another embodiment of the invention.

FIG. 7 is a flow diagram of an example method 700 for facilitating comprehension of user queries during interactions, in accordance with another embodiment of the invention. The method 700 depicted in the flow diagram may be executed by, for example, the apparatus 200 explained with reference to FIGS. 2 to 5. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of a processor, such as the processor 102 of the apparatus 200. It is noted that, the operations of the method 600 can be described and/or practiced by using an apparatus other than the apparatus 200. The method 700 starts at operation 702.

At operation 702 of the method 700, a natural language query input provided by a user during a voice call interaction between the user and an agent associated with an enterprise is received.

At operation 704 of the method 700, the natural language query input is converted into textual form by a processor to generate one or more query terms. In at least some embodiments, the user queries received in natural language form may be converted into textual form using natural language processing techniques that are based on a special grammar that is trained to identify certain keywords more accurately than others. An example of one such grammar type is statistical language models (SLM), which takes into consideration the sequence of words to get the best transcription.

At operation 706 of the method 700, the one or more query terms are compared by the processor with respective content elements in a plurality of content records stored in a database with the one or more query terms for at least a partial match in relevancy. Each content record from among the plurality of content records is associated with a respective comparison result subsequent to the comparison. The comparison of the one or more query terms with content elements in the content records may be performed as explained with reference to operation 604 and is not explained herein.

At operation 708 of the method 700, a score is generated by the processor for the each content record based on the respective comparison result and a measure of comprehension between the natural language query input and the plurality of content records. The measure of comprehension between the natural language query input and the plurality of content records is determined using respective comparison results for the plurality of content records. The generation of the score for the each content record configures a set of scores. The generation of the score for the each content record may be performed as explained with reference to operation 606 and is not explained herein.

At operation 710 of the method 700, a confidence state corresponding to the set of scores is determined by the processor based on the score for the each content record in the set of scores. At operation 712 of the method 700, a reply is provided to the user in response to the natural language query input based on the confidence state. The determination of the confidence state and the provisioning of the reply to the user based on the determined confidence state may be performed as explained with reference to operations 608 and 610, respectively and is not explained herein. The method 700 stops at operation 712.

Without in any way limiting the scope, interpretation, or application of the claims appearing below, advantages of one or more of the exemplary embodiments disclosed herein provide numerous advantages. The techniques disclosed herein facilitate user interactions involving provisioning of substantially improved responses to the users. More specifically, the method and the apparatus disclosed herein facilitate a creation of a framework where 'bi-directional' comprehension between a knowledge base (i.e. a database, such as the database 210) and the current end-user question is measured, or in other words, how well does the knowledge base understand the question and how well does the question understand the knowledge base. Moreover, the bi-directional manner of comprehension score calculation serves not only as a measure to identify relevance of the answers to the user question but also serves as a measure of a cohesion or coherence of the question vis-à-vis the content in the knowledge base. The bi-directional comprehension is utilized to improve an underlying quality of the one right answers and suggested answers returned to the user. Moreover, a granular measure of confidence for any end-user question is determined to provide not only a measure of confidence in the answer(s), but also provides insight on what next steps should be taken to optimize the overall understanding of Q&A platform. Furthermore, techniques disclosed herein set the framework and output needed for further disambiguation technologies. In some example scenarios, techniques disclosed herein may also be used to provide suggested answer titles for technologies that show evolving lists of possible answers as the end-user types their question into the question box. Accordingly, the method and the apparatus disclosed herein suggest a framework for facilitating user interactions in a manner where the user input is comprehended vis-à-vis responses stored in a knowledge base and substantially improved quality of response (or responses) is provided to the user, thereby precluding frustrating and unsuccessful interaction experiences for the users and operating losses for the enterprises.

Various embodiments described above may be implemented in software, hardware, application logic or a combination of software, hardware and application logic. The software, application logic and/or hardware may reside on one or more memory locations, one or more processors, an electronic device or, a computer program product. In an embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution apparatus, apparatus, or device, as described and depicted in FIG. 2. A computer-readable medium may comprise a computer-readable storage medium that may be any media or means that can contain or store the instructions for use by or in connection with an instruction execution apparatus, apparatus, or device, such as a computer.

Although the present technology has been described with reference to specific exemplary embodiments, it is noted that various modifications and changes may be made to these embodiments without departing from the broad spirit and scope of the present technology. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the apparatus 200, the processor 202, the memory 204 and the I/O module 206 may be enabled using software and/or using transistors, logic gates, and electrical circuits (for example, integrated circuit circuitry such as ASIC circuitry). Various embodiments of the present technology may include one or more computer programs stored or otherwise embodied on a computer-readable medium, wherein the computer programs are configured to cause a processor or computer to perform one or more operations (for example, operations explained herein with reference to FIGS. 6 and 7). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the present disclosure, as discussed above, may be practiced with steps and/or operations in a different order, and/or with hardware elements in configurations, which are different than those which, are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A computer-implemented method, comprising:
   receiving a query input provided by a user, the query input comprising one or more query terms;
   comparing, by a processor, the one or more query terms with respective content elements in a plurality of content records stored in a database for at least a partial match in relevancy, wherein each content record from among the plurality of content records is associated with a respective comparison result subsequent to the comparison;
   generating, by the processor, a score for the each content record based on the respective comparison result and a measure of comprehension between the query input and the plurality of content records, wherein the measure of comprehension is determined using respective comparison results for the plurality of content records and, wherein generation of the score for the each content record configures a set of scores;
   determining, by the processor, a confidence state corresponding to the set of scores based on the score for the each content record in the set of scores; and
   providing a reply to the user in response to the query input based on the confidence state, wherein providing the reply to the user comprises:
   generating an instruction based on the determined confidence state; and
   selecting a text snippet from among a plurality of text snippets stored in the database based on the generated instruction, wherein the text snippet configures, at least in part, the reply provided to the user, said snippet comprising either a confidence level corresponding to the confidence state, said confidence state associated with the set of scores indicating relative to a pre-set threshold whether the search results address the query or said text snippet comprising information regarding further user action to be taken in connection with the query.

2. The method of claim 1, wherein the query input corresponds to a search related text entry provided by the user using a search interface on a website.

3. The method of claim 1, wherein the query input corresponds to a user enquiry received during an on-going interaction between the user and an enterprise representative.

4. The method of claim 3, wherein the on-going interaction corresponds to a chat interaction between the user and a virtual agent.

5. The method of claim 3, wherein the on-going interaction corresponds to a voice call interaction between the user and an interactive voice response (IVR) system.

6. The method of claim 1, wherein the measure of comprehension between the query input and the plurality of content records is determined, at least in part, based on a spread of relevancy matching content elements for each query term of the query input in the plurality of content records stored in the database.

7. The method of claim 1, wherein the score generated for the each content record is an absolute value capable of being compared with scores generated for remaining content records in response to a plurality of query inputs.

8. The method of claim 1, wherein the text snippet is provided to the user along with one or more content records selected from among the plurality of content records based on the respective scores.

9. The method of claim 1, wherein if a score for a content record from among the plurality of content records is greater than a first predefined threshold value and scores for remaining content records from among the plurality of content records are less than a second predefined threshold value, then the confidence state indicating identification of one right answer corresponding to the query input is determined.

10. The method of claim 9, further comprising:
effecting, by the processor, display of the content record associated with the score greater than the first predefined threshold value along with the text snippet upon determination of the confidence state indicating identification of the one right answer corresponding to the query input.

11. The method of claim 1, wherein if scores for two or more content records from among the plurality of content records are determined to be less than or equal to a second predefined threshold value and greater than or equal to a third predefined threshold value, then the confidence state indicating identification of multiple tentative answers corresponding to the query input is determined.

12. The method of claim 1, wherein if scores for two or more content records from among the plurality of content records is greater than or equal to a fourth predefined threshold value and scores for remaining content records from among the plurality of content records are less than or equal to a second predefined threshold value, then the confidence state indicating identification of multiple user questions in the query input is determined.

13. The method of claim 12, wherein the text snippet is configured to request the user to provide a subsequent query input comprising a single question.

14. The method of claim 1, wherein if respective scores for the plurality of content records are less than a fifth predefined threshold value, then the confidence state indicating an irrelevant query input is determined.

15. The method of claim 14, wherein the text snippet is configured to request the user to provide a relevant query input.

16. The method of claim 14, wherein the text snippet comprises an offer to interact with an agent.

17. An apparatus, comprising:
at least one processor; and
a memory comprising a database, the database comprising a plurality of content records, the memory having stored therein machine executable instructions, that when executed by the at least one processor, cause the apparatus to:
receive a query input provided by a user, the query input comprising one or more query terms;
compare the one or more query terms with respective content elements in the plurality of content records stored in the database for at least a partial match in relevancy, wherein each content record from among the plurality of content records is associated with a respective comparison result subsequent to the comparison;
generate a score for the each content record based on the respective comparison result and a measure of comprehension between the query input and the plurality of content records, wherein the measure of comprehension is determined using respective comparison results for the plurality of content records and, wherein generation of the score for the each content record configures a set of scores;
determine a confidence state corresponding to the set of scores based on the score for the each content record in the set of scores; and
provide a reply to the user in response to the query input based on the confidence state, wherein to provide the reply to the user, the apparatus is further caused to:
generate an instruction based on the determined confidence state; and
select a text snippet from among a plurality of text snippets stored in the database based on the generated instruction, wherein the text snippet configures, at least in part, the reply provided to the user, said snippet comprising either a confidence level corresponding to the confidence state, said confidence state associated with the set of scores indicating relative to a pre-set threshold whether the search results address the query or said text snippet comprising information regarding further user action to be taken in connection with the query.

18. The apparatus of claim 17, wherein the query input corresponds to a search related text entry provided by the user using a search interface on a website.

19. The apparatus of claim 17, wherein the query input corresponds to a user enquiry received during an on-going interaction between the user and an enterprise representative.

20. The apparatus of claim 17, wherein the score generated for the each content record is an absolute value capable of being compared with scores generated for remaining content records in response to a plurality of query inputs.

21. The apparatus of claim 17, wherein the text snippet is provided to the user along with one or more content records selected from among the plurality of content records based on the respective scores.

22. The apparatus of claim 17, wherein if a score for a content record from among the plurality of content records is greater than a first predefined threshold value and scores for remaining content records from among the plurality of content records are less than a second predefined threshold value, then the confidence state indicating identification of one right answer corresponding to the query input is determined.

23. The apparatus of claim 22, wherein the apparatus is further caused to:
effect display of the content record associated with the score greater than the first predefined threshold value along with the text snippet upon determination of the confidence state indicating identification of the one right answer corresponding to the query input.

24. The apparatus of claim 17, wherein if scores for two or more content records from among the plurality of content records are determined to be less than or equal to a second predefined threshold value and greater than or equal to a third predefined threshold value, then the confidence state indicating identification of multiple tentative answers corresponding to the query input is determined.

25. The apparatus of claim 17, wherein if scores for two or more content records from among the plurality of content records is greater than or equal to a fourth predefined threshold value and scores for remaining content records from among the plurality of content records are less than or equal to a second predefined threshold value, then the confidence state indicating identification of multiple user questions in the query input is determined.

26. The apparatus of claim 25, wherein the text snippet is configured to request the user to provide a subsequent query input comprising a single question.

27. The apparatus of claim 17, wherein if respective scores for the plurality of content records are less than a fifth predefined threshold value, then the confidence state indicating an irrelevant query input is determined.

28. The apparatus of claim 27, wherein the text snippet is configured to request the user to provide a relevant query input.

29. The apparatus of claim 27, wherein the text snippet comprises an offer to interact with an agent.

30. A computer-implemented method comprising:
receiving a natural language query input provided by a user during a voice call interaction between the user and an agent associated with an enterprise;
converting, by a processor, the natural language query input into textual form to generate one or more query terms;
comparing, by the processor, the one or more query terms with respective content elements in a plurality of content records stored in a database for at least a partial match in relevancy, wherein each content record from among the plurality of content records is associated with a respective comparison result subsequent to the comparison;
generating, by the processor, a score for the each content record based on the respective comparison result and a measure of comprehension between the natural language query input and the plurality of content records, wherein the measure of comprehension is determined using respective comparison results for the plurality of content records and, wherein generation of the score for the each content record configures a set of scores;
determining, by the processor, a confidence state corresponding to the set of scores based on the score for the each content record in the set of scores; and
providing a reply to the user in response to the natural language query input based on the confidence state, wherein providing the reply to the user comprises:
generating an instruction based on the determined confidence state; and
selecting a text snippet from among a plurality of text snippets stored in the database based on the generated instruction, wherein the text snippet configures, at least in part, the reply provided to the user, said snippet comprising either a confidence level corresponding to the confidence state, said confidence state associated with the set of scores indicating relative to a pre-set threshold whether the search results address the query or said text snippet comprising information regarding further user action to be taken in connection with the query.

31. The method of claim 30, wherein the agent associated with the enterprise is an interactive voice response (IVR) system.

32. The method of claim 30, wherein the wherein the measure of comprehension between the query input and the plurality of content records is determined, at least in part, based on a spread of relevancy matching content elements for each query term of the query input in the plurality of content records stored in the database.

33. The method of claim 30, wherein if a score for a content record from among the plurality of content records is greater than a first predefined threshold value and scores for remaining content records from among the plurality of content records are less than a second predefined threshold value, then the confidence state indicating identification of one right answer corresponding to the query input is determined.

34. The method of claim 33, further comprising:
effecting, by the processor, display of the content record associated with the score greater than the first predefined threshold value along with the text snippet upon determination of the confidence state indicating identification of the one right answer corresponding to the query input.

35. The method of claim 30, wherein if scores for two or more content records from among the plurality of content records are determined to be less than or equal to a second predefined threshold value and greater then or equal to a third predefined threshold value, then the confidence state indicating identification of multiple tentative answers corresponding to the query input is determined.

36. The method of claim 30, wherein if scores for two or more content records from among the plurality of content records is greater than or equal to a fourth predefined threshold value and scores for remaining content records from among the plurality of content records are less than or equal to a second predefined threshold value, then the confidence state indicating identification of multiple user questions in the query input is determined.

37. The method of claim 36, wherein the text snippet is configured to request the user to provide a subsequent query input comprising a single question.

38. The method of claim 30, wherein if respective scores for the plurality of content records are less than a fifth predefined threshold value, then the confidence state indicating an irrelevant query input is determined.

39. The method of claim 38, wherein the text snippet is configured to request the user to provide a relevant query input.

40. The method of claim 38, wherein the text snippet comprises an offer to interact with an agent.

\* \* \* \* \*